United States Patent

Thimmesch et al.

[11] Patent Number: 5,887,575
[45] Date of Patent: Mar. 30, 1999

[54] AIR INTAKE HEATER WITH VERTICALLY ORIENTED HEATING ELEMENTS

[75] Inventors: Jan P. Thimmesch, Eden Prairie; Bradley A. Hemish, Shakopee, both of Minn.

[73] Assignee: Phillips & Temro Industries Inc., Eden Prairie, Minn.

[21] Appl. No.: 927,003

[22] Filed: Sep. 10, 1997

Related U.S. Application Data

[63] Continuation-in-part of Ser. No. 582,747, Jan. 4, 1996, Pat. No. 5,743,242.

[51] Int. Cl.$^6$ .................................................. F02M 31/00
[52] U.S. Cl. ......................................... 123/549; 123/556
[58] Field of Search .................................... 123/549, 543, 123/545, 546, 547, 556

[56] References Cited

U.S. PATENT DOCUMENTS

| | | |
|---|---|---|
| 909,898 | 1/1909 | Hertzberg et al. . |
| 1,068,322 | 7/1913 | Church et al. . |
| 1,136,845 | 4/1915 | Tate . |
| 1,369,551 | 2/1921 | Schmid . |
| 1,456,018 | 5/1923 | Wiegand . |
| 1,724,481 | 8/1929 | Heginbottom et al. . |
| 1,931,379 | 10/1933 | Graziano . |
| 1,931,837 | 10/1933 | Belanger . |
| 2,115,634 | 4/1938 | Kiesel . |
| 2,177,840 | 10/1939 | Roualet . |
| 2,668,900 | 2/1954 | Kwartz . |
| 3,088,447 | 5/1963 | Henderson . |
| 3,492,457 | 1/1970 | Subt . |
| 3,625,190 | 12/1971 | Boissevain . |
| 3,892,215 | 7/1975 | Hickling et al. . |
| 3,912,903 | 10/1975 | Northrup, Jr. et al. . |
| 4,020,812 | 5/1977 | Hayward . |
| 4,106,454 | 8/1978 | Henlis . |
| 4,108,125 | 8/1978 | Marcoux et al. . |
| 4,363,958 | 12/1982 | Kobayashi et al. . |
| 4,395,994 | 8/1983 | Goto et al. . |
| 4,463,721 | 8/1984 | Hayashi et al. . |
| 4,501,255 | 2/1985 | Van Der Ploeg et al. . |
| 4,651,702 | 3/1987 | Nara et al. . |
| 4,667,645 | 5/1987 | Gluckman . |
| 4,685,437 | 8/1987 | Tanaka et al. . |
| 4,870,249 | 9/1989 | Kayanuma et al. . |
| 4,944,260 | 7/1990 | Shea et al. . |
| 5,743,242 | 4/1998 | Thimmesch .............................. 123/549 |

FOREIGN PATENT DOCUMENTS

| | | |
|---|---|---|
| 648536 | 12/1928 | France . |
| 771774 | 4/1934 | France . |
| 867019 | 9/1941 | France . |
| 4410820 | 10/1994 | Germany . |
| 62-91649 | 4/1987 | Japan . |
| 194009 | 3/1923 | United Kingdom . |
| 667509 | 3/1952 | United Kingdom . |
| 2067245 | 7/1981 | United Kingdom . |

OTHER PUBLICATIONS

European search report, Application No. EP 96 11 9723 (based on the parent 08/582,747 of this application) dated Apr. 28, 1997.

*Primary Examiner*—Marguerite McMahon
*Attorney, Agent, or Firm*—Harness Dickey & Pierce, P.L.C.

[57] ABSTRACT

A heating device for use in an internal combustion engine for heating the air entering the cylinder head from the intake manifold. The heating device includes a frame having a body defining an air intake opening and a hanger extending from the body. The heating device further includes a first resistance ribbon and a terminal assembly coupled to the frame, electrically connected to the first resistance ribbon and electrically connectable with a power source. Finally, the heating device includes securing means for coupling the first resistance ribbon to the hanger in a vertical orientation.

20 Claims, 8 Drawing Sheets

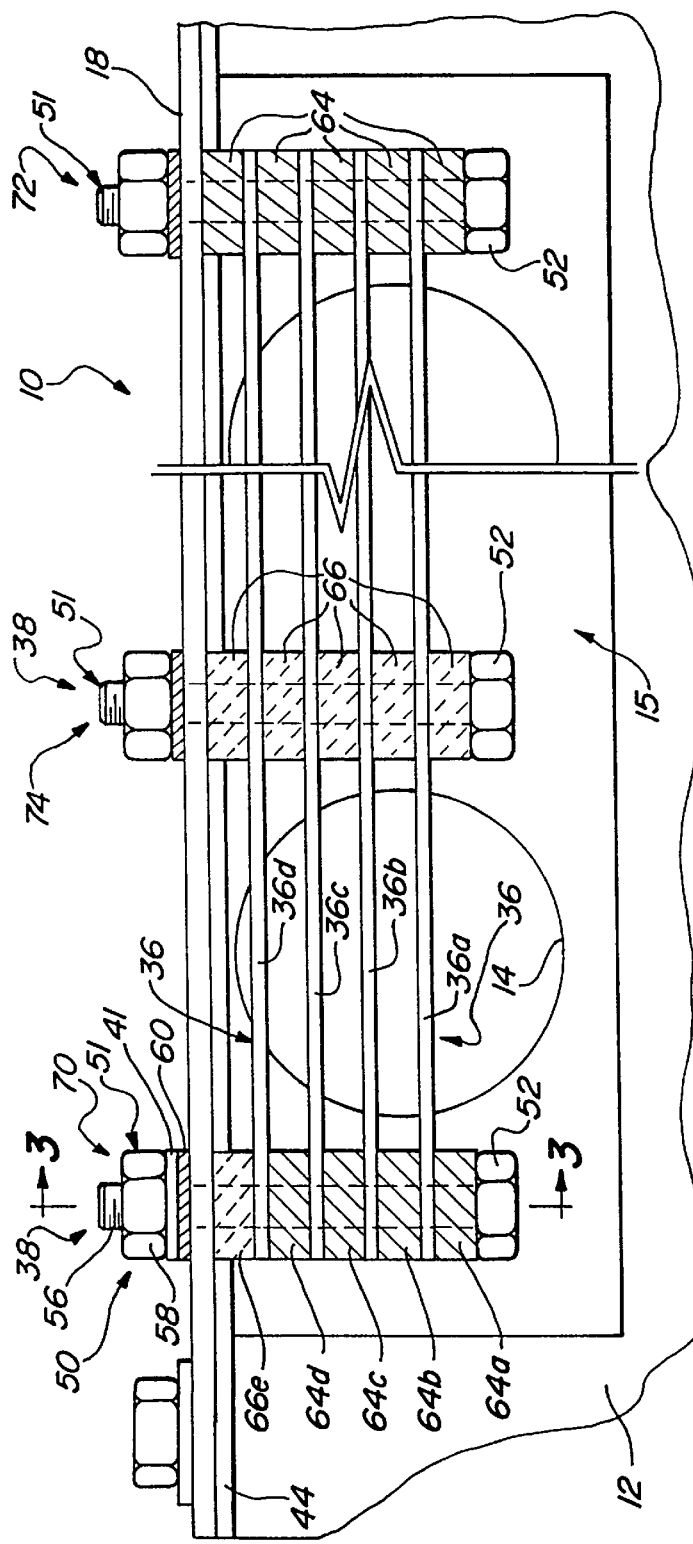
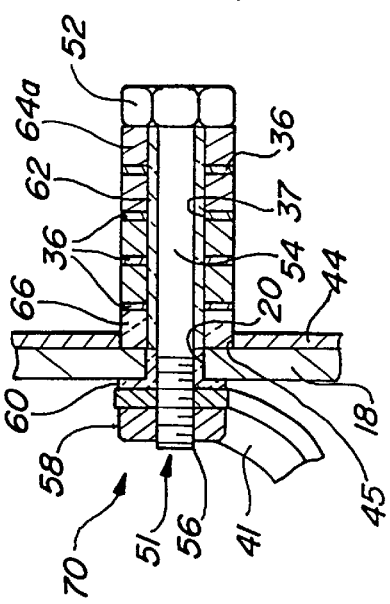

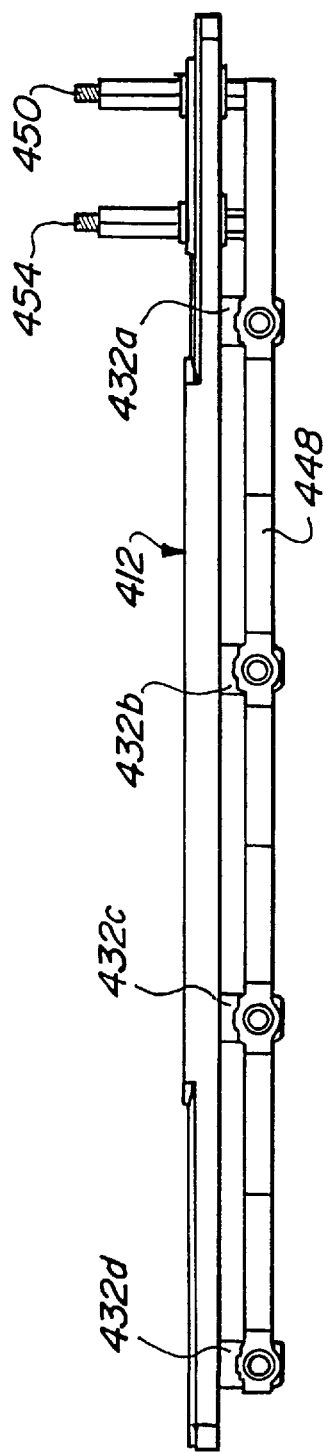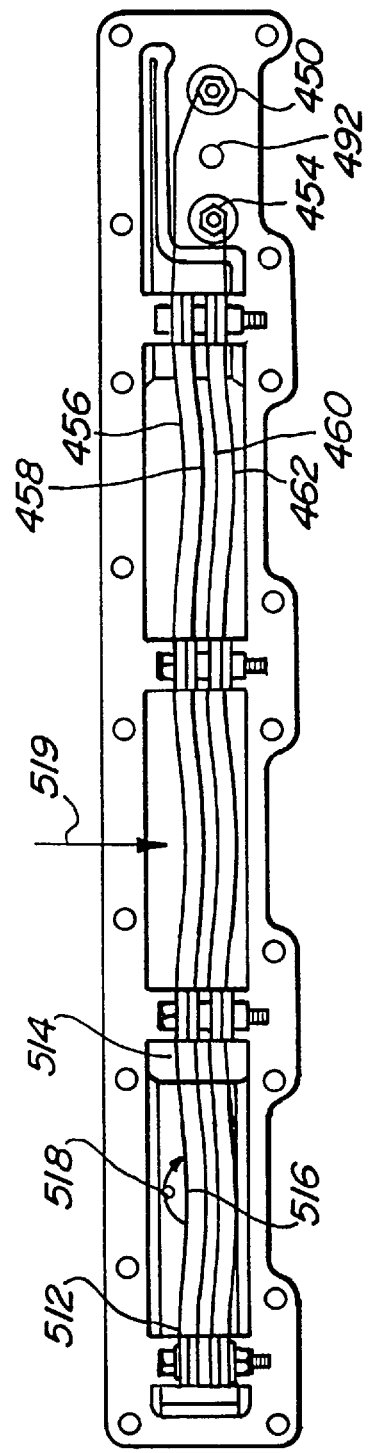

AIR INTAKE HEATER WITH VERTICALLY ORIENTED HEATING ELEMENTS

This is a continuation in part of application Ser. No. 08/582,747 filed Jan. 4, 1996, now Pat. No. 5,743,242.

BACKGROUND OF THE INVENTION

1. Technical Field

This invention generally relates to electrical heaters and, more particularly, to an apparatus for heating the air/fuel mixture entering the cylinder of an internal combustion engine.

2. Discussion

The prior art has addressed the desirability of heating the environment of the intake manifold including the air/fuel mixture exiting the carburetor of an internal combustion engine in order to increase fuel economy and decrease pollutant discharge. One type of intake heating device generally includes a pair of gaskets surrounding a heating coil or grid disposed between the carburetor and the air intake manifold as shown in U.S. Pat. No. 4,020,812 to Hayward and U.S. Pat. No. 4,106,454 to Henlis. The gaskets in these devices not only prevent air leaks into and out of the manifold but also thermally and electrically isolate the grid from the intake structure. However, as recognized and addressed in U.S. Pat. No. 5,595,164, entitled "Low Profile Intake Manifold Heater", issued Jan. 21, 1997, gasket wear or aging may eventually short the electric circuit through the heating element.

The invention disclosed in U.S. Pat. No. 5,595,164 minimizes concerns relating to shorting of the heating element circuit by recessing at least one continuous coil type heating element in a mounting frame. The heating element is coupled to insulating material that thermally and electrically isolates the heating element from the mounting frame. Additionally, the heating element is shaped to nest within the insulating material which, in turn, floats within a mounting channel formed in the frame. As a result of this floating arrangement, the mounting channel and insulating material cooperate to structurally support the heating element.

While the invention disclosed in U.S. Pat. No. 5,595,164 has performed satisfactorily, still further improvements can be made, especially where engine designs permit them. For example, the cost of insulating material possessing a structural strength sufficient to support the coils, such as a ceramic, is generally greater than the cost of insulated material having less structural integrity. In light of these issues, it is desirable to provide a heating element that rigidly connects a plurality of heating ribbons to a frame or mounting member such that the mounting apparatus exhibits sufficient structural strength to resist the vibrational stresses created by the engine while isolating the electrical connection from the gaskets of the heating device.

A further deficiency present in some of the heater devices is that the heating grids used therein generally consist of a single continuous coil of resistance wire or ribbon having one end connected to an electric power source and a second end connected to ground. While such continuous coils of resistance ribbon may effectively heat the intake air/fuel mixture in the specific applications for which the coils are designed, continuous coils provide only a single heating capacity for a given supply voltage. Thus, if a different heating capacity is desired in a given application, the entire heating coil must often be replaced with a new element having the appropriate resistance or, alternatively, the supply voltage may be changed. The present invention provides a heating element wherein the heating capacity of the resistance ribbon may be varied by adjusting the length of resistance ribbon in the circuit or changing the circuit from a plurality of ribbon elements electrically connected in series to a plurality of ribbon elements connected in parallel.

Finally, heating devices that address some of the above deficiencies include numerous parts for coupling the heating ribbons to the frame or mounting member in a horizontally oriented arrangement that is restrictive of the airflow passing the heating ribbons and into the cylinders.

SUMMARY OF THE INVENTION

One object of the present invention is to provide an improved electric heater device having a plurality of resistance ribbons electrically connectable in series or in parallel.

Another object of the present invention is to provide an improved electric heater device including a mounting member and securing means for rigidly connecting resistance ribbons to the mounting member thereby minimizing concerns relating to vibrational stresses created by the engine and increasing the durability of the heater device.

It is an additional object of the present invention to improve the airflow and heat transfer characteristics of an engine heater device by providing securing means that rigidly connect the resistance ribbons to the mounting member without the need for a frame having side walls.

A further object of the present invention is provide an electric heater device wherein the resistance ribbons are coupled to the mounting member so that when the mounting member is connected to the intake housing of the internal combustion engine, the resistance ribbons are located proximate to the engine cylinders thereby minimizing the distance from the resistance ribbons to the combustion chamber and the heat lost by the heated air/fuel mixture when traveling this distance.

It is also an object of the present invention to provide an improved heater device using plate-like resistance ribbon sections thereby eliminating concerns over the manufacturing stresses created and tolerances required in bending resistance ribbons.

Another object of the present invention is to provide an electric heater device wherein the heating element may be disassembled into a plurality of plates, bolts, nuts, insulators and spacers thereby decreasing the size and costs associated with shipping the device.

A still further object of the present invention is to provide a heater cover having cast-in supports or hangers for suspending heating ribbons in a vertically oriented arrangement beneath the air intake manifold of the internal combustion engine.

Accordingly, one embodiment of the invention provides an electric heater device having a mounting member supporting a heater element and connectable to the cylinder head of an internal combustion engine. Gaskets provide a seal between the mounting member and the surrounding cylinder head and, if necessary, the heating device cover. The heater device includes a plurality of resistance ribbons removably yet rigidly connected to the mounting member by securing means that preferably include a plurality of bolts, cooperating nuts, insulating sleeves and conductive and insulating spacers. Each bolt cooperates with an insulating sleeve to provide a nonconducting mounting post upon which the resistance ribbons are disposed and separated by the spacers to create a grid of ribbons electrically connectable in parallel or in series.

Additionally, another embodiment of the present invention includes a cover for an electric heating device including cast-in hangers for supporting heating elements in a vertical arrangement beneath the air intake manifold. The heater device includes the cover and the heater elements which are electrically connectable to a power source by one or more positive terminals coupled to the cover. More specifically, each heating element is contemplated to include two ribbons connected in series to one of the positive terminals and to the cover or a third terminal used as an isolated ground. The vertical orientation of the heating ribbons reduces the restriction to airflow from the air intake manifold to the cylinders.

BRIEF DESCRIPTION OF THE DRAWINGS

The objects and features of this invention will become further apparent from a reading of the following detailed description taken in conjunction with the drawings, in which:

FIG. 2 is a partial sectional view taken along the lines 2—2 of FIG. 1 and illustrates the heating element connection to the mounting member and the resistance ribbons electrically connected in parallel;

FIG. 3 is a sectional view taken along the lines 3—3 of FIGS. 1 and 2 and illustrating a sectional view of the first end mounting post and securing means;

FIG. 11 is an elevational view of a still further embodiment of the heating device; and FIG. 12 is a bottom plan view of the heating device shown in FIG. 11.

DETAILED DESCRIPTION OF THE PREFERRED EMBODIMENT

Figure 1:
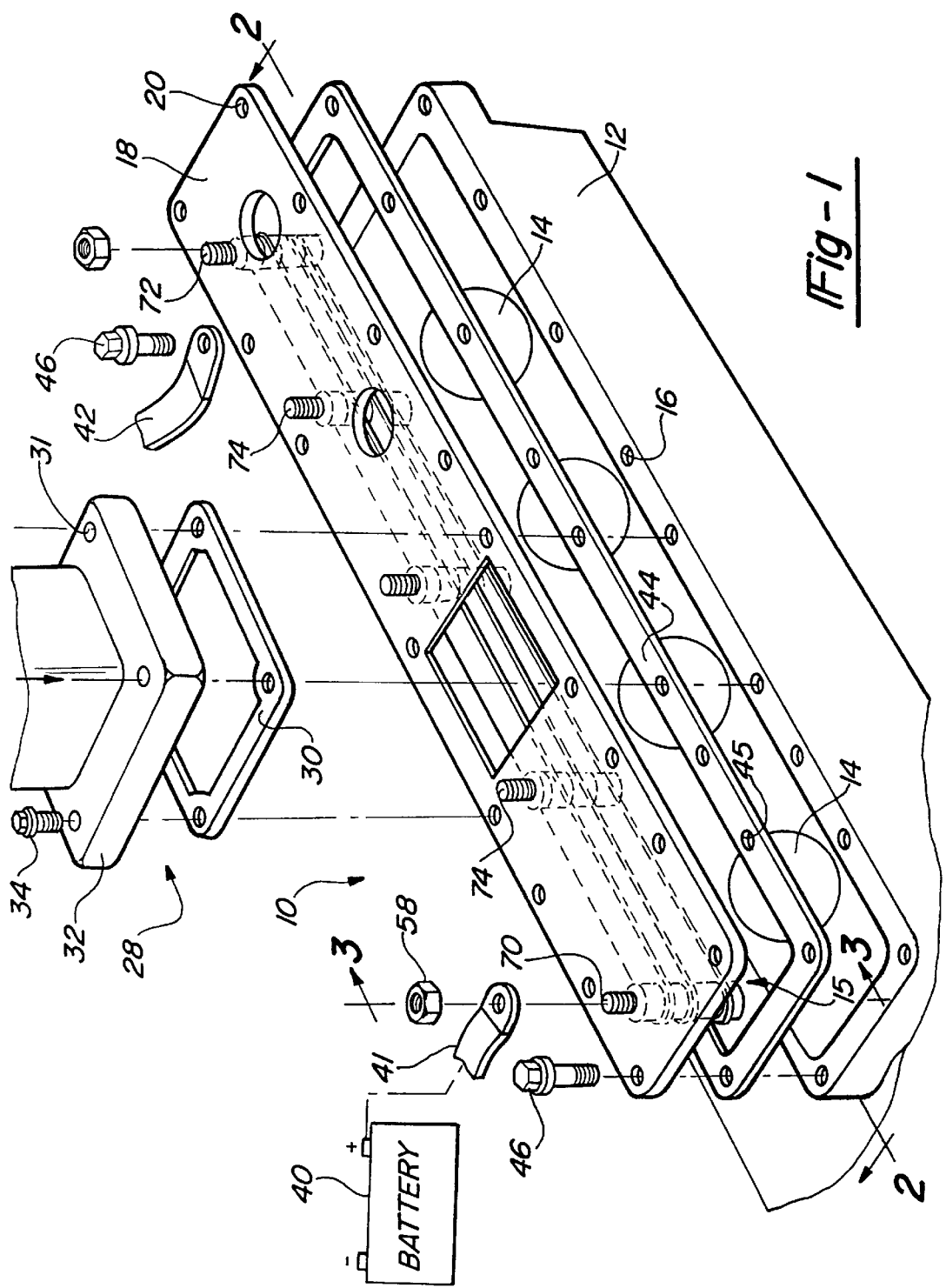
FIG. 1 is an exploded perspective of a first embodiment of the heating device made in accordance with the teachings of this invention as assembled and mounted to a cylinder head in an internal combustion engine.

With reference to FIG. 1, the invention disclosed herein includes a heating device 10 coupled to a cylinder head 12 of an internal combustion engine. Cylinder head 12 has a plurality of cylinder intake openings 14 and a plurality of threaded bores 16 formed therein. Heating device 10 includes a heating element 15 coupled to a plate-like mounting member 18 having apertures 20 and an air intake opening 22 formed therein. Air intake opening 22 cooperates with an air intake supply apparatus 28 to convey an air/fuel mixture from a carburetor or other source to heating device 10 and intake opening 14. Heating element 15 includes a plurality of mounting posts 38 supporting a plurality of resistance ribbons 36 (FIG. 2) which, when connected to a power source such as a battery 40, generate heat to warm the air/fuel mixture entering cylinder intake opening 14.

Air intake supply apparatus 28 is shown to include a gasket 30 disposable about air intake opening 22 and cooperative with an air intake supply apparatus housing 32. In the preferred embodiment, a plurality of threaded bolts 34 cooperate with a plurality of apertures 31 formed in air intake supply apparatus housing 32 and certain of apertures 20 in mounting member 18 and threaded bores 16 in cylinder head 12 to sealingly couple heating device 10 to intake supply apparatus 28. It should be appreciated, however, that other structures known in the art for conveying an air/fuel mixture to cylinder head 12 may be used without departing from the scope of the present invention. For example, it is contemplated that a formed in place gasket material may be used in lieu of gasket 30.

Heating device 10 further includes a gasket 44 having apertures 45 cooperative with mounting bolts 46 (FIG. 1). Mounting bolts 46 are threaded to cooperate with threaded bores 16 in cylinder head 12 and apertures 20 in mounting member 18 to removably yet sealingly couple heating device 10 to cylinder head 12. It should be appreciated that mounting member 18 may be electrically connected to cylinder head 12 by a ground strap 42 or directly connected thereto by threaded mounting bolts 46.

Turning now to the structure of and support for heating element 15, mounting posts 38 are coupled to mounting member 18 and preferably include a first end post 70 electrically connected to a battery 40, a second end post 72, and a plurality of intermediate posts 74. In the embodiment shown in FIGS. 1–3 and as most clearly illustrated in FIG. 2, mounting posts 38 are coupled to mounting member 18 so as to locate resistance ribbons 36 proximate to intake openings 14 in cylinder head 12. This arrangement minimizes the distance that the air/fuel mixture must travel to reach the combustion chambers of the internal combustion engine (not shown) following heating by resistance ribbons 36. As a result, the efficiency of the heating device disclosed herein is improved without requiring additional resistance ribbons or increased energy consumption.

With referenced to FIGS. 2 and 3, heating device 10 includes securing means 50 for connecting mounting posts 38 to mounting member 18. In the embodiment shown in FIGS. 1–3, a bolt 51, including a bolt head 52, a body portion 54 and a threaded end 56, cooperates with a threaded nut 58 to form securing means 50. Further, an insulator sleeve 62 surrounds bolt 51 thereby forming mounting post 38 upon which a plurality of conducting and nonconducting spacers 64 and 66, respectively, and resistance ribbons 36 are mounted. As illustrated in FIG. 3, a conducting element such as a power strap 41 electrically connects a first end post 70 of mounting posts 38 to battery 40 while an insulator bushing 60 electrically isolates mounting strap 41 from mounting member 18.

Resistance ribbons 36 are generally comprised of electrically conductive material having a predetermined resistivity and are shaped to provide the desired total resistance in the length and space available. Accordingly, resistance ribbons 36 may include a multitude of cross-sectional configurations while, in the preferred embodiment illustrated in the attached figures, resistance ribbons 36 are plate-like members of a length sufficient to extend from first end post 70 to second end post 72. Further, each resistance ribbon includes a plurality of apertures 37 (FIG. 3) having a diameter or opening large enough to cooperate with bolt 51 and insulator sleeve 62 yet small enough to ensure that resistance ribbons 36 contact and are supported and separated by spacers 64, 66. As a result of this arrangement, resistance ribbons 36 are removably yet rigidly held in place by the compressive forces generated by the tightening of threaded bolts 51 relative to threaded nut 58. It should be appreciated by those skilled in the art that each resistance ribbon 36 may also be comprised of a plurality of short plates electrically coupled to one another at mounting posts 38.

Figure 5:
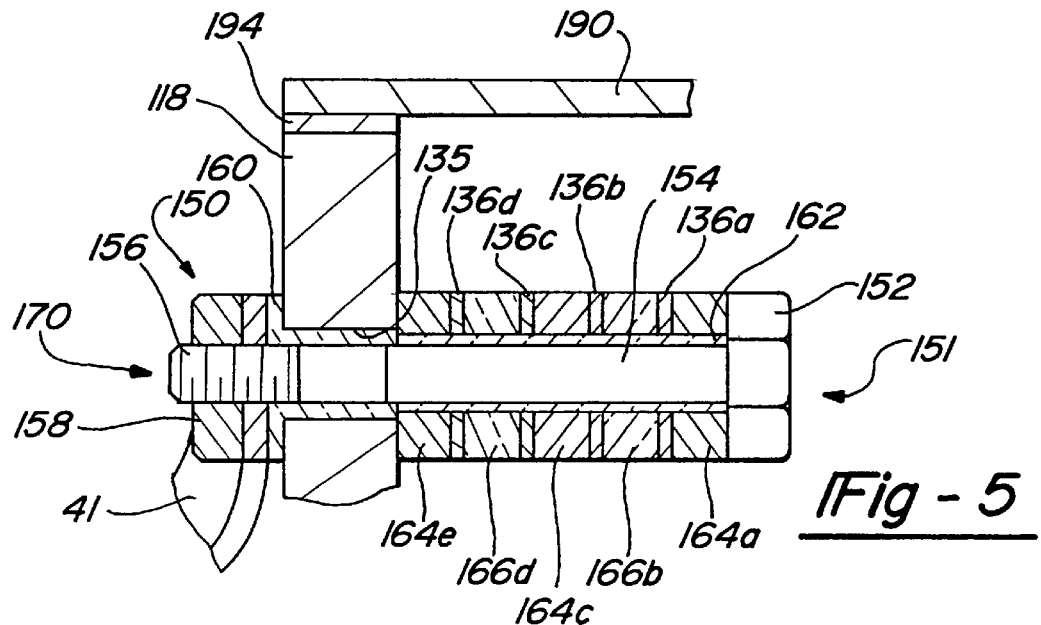
FIG. 5 is a sectional view taken along the lines 5—5 of FIG. 4 illustrating the first end post and securing means when the resistance ribbons are electrically connected in series.
Figure 6:
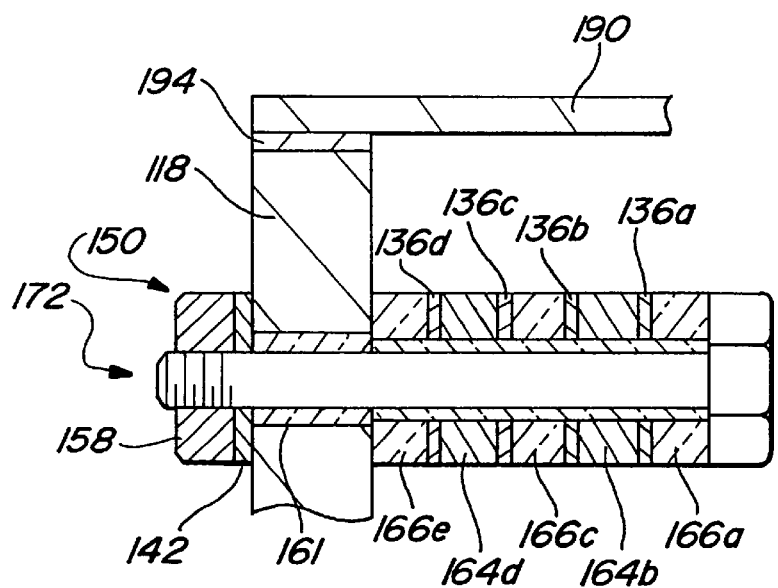
FIG. 6 is a sectional view taken along the lines 6—6 of FIG. 4 and illustrating the second end post and securing means when the resistance ribbons are electrically connected in series.

While mounting posts 38 are shown coupled to frame mounting member 18 through the cooperative arrangement of frame aperture 20, mounting bolt 51 and threaded nut 58, it should be appreciated that any method known in the art for coupling posts to a frame may be used without departing from the intended scope of the claimed invention. However, it is preferred that a removable connection such as that provided by securing means 50 shown in FIGS. 2 and 3 be used to allow adjustment of the arrangement of resistance ribbons 36, conducting spacers 64 and insulating spacers 66 such that resistance ribbons 36 may be electrically connected to battery 40 either in parallel as shown in FIGS. 2 or 3 or in series as shown in FIGS. 5 and 6. Further, removable mounting posts allow partial disassembly of heating element 15 thereby decreasing the shipping size of heating device 10 and the costs associated therewith.

An additional advantage of the removable connection disclosed herein is that additional resistance to the stresses created by engine vibration is provided by the pass-through bolt and nut arrangement shown. Those skilled in the art will further appreciate that the number, spacing, and cross-section of mounting posts 38, particularly intermediate posts 74, is dependent upon the forces to which mounting posts 38 are subjected and the structural strength of resistance ribbons 36. Again, the forces of particular concern are caused by the vibration generated by the engine to which heating device 10 is connected.

Prior to discussing the specific arrangement and relative locations of conducting spacers 64, insulating spacers 66 and resistance ribbons 36, the alternative embodiment of heating device 10 will be described. The heating device shown in FIGS. 4–6 includes several elements substantially identical to the heating device shown in FIGS. 1–3 and previously described herein. Therefore, substantially identical members are referenced in FIGS. 4–6 by substantially identical alphanumeric characters.

Figure 4:
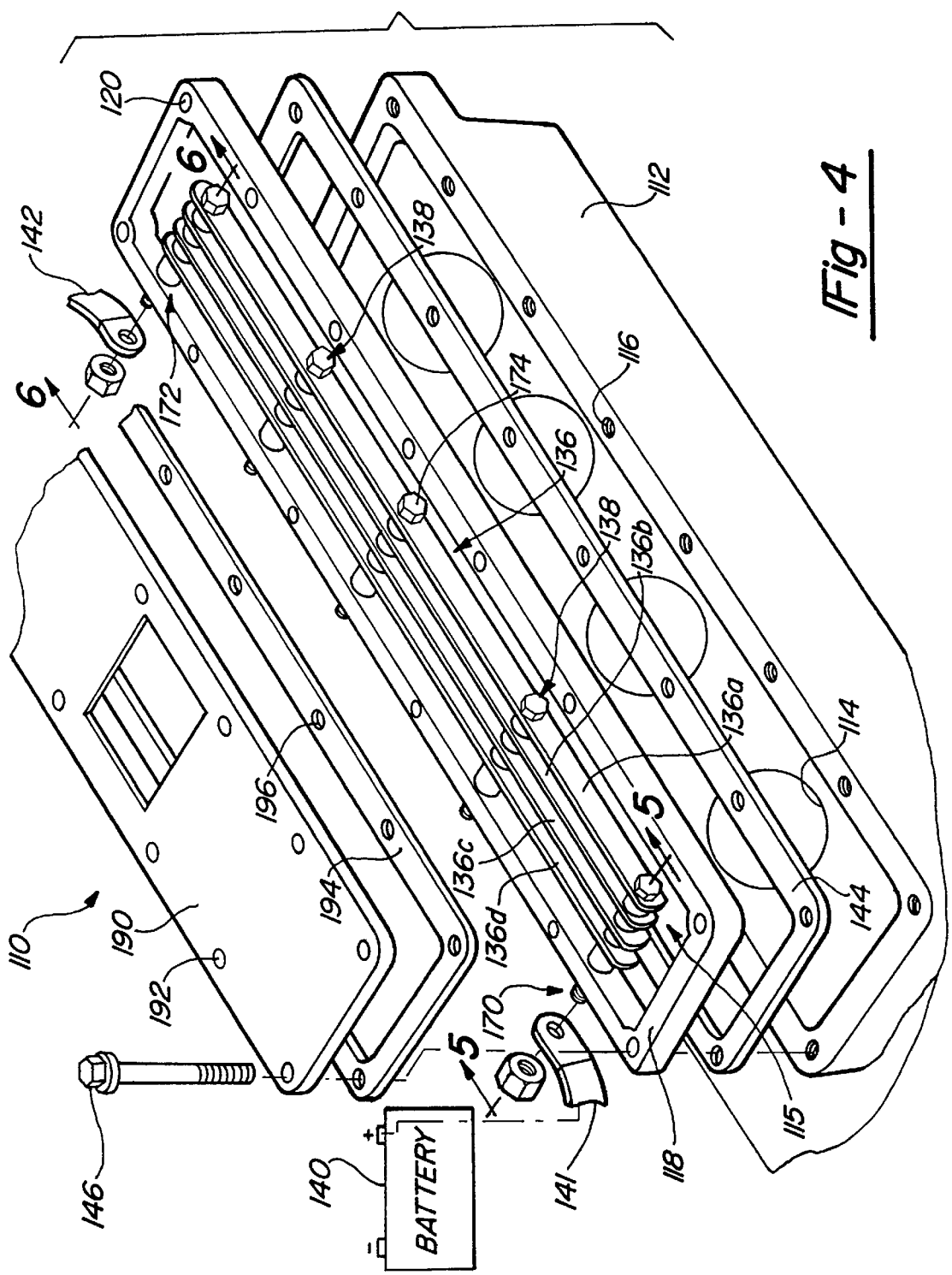
FIG. 4 is an exploded perspective view of a second embodiment of the heating device made in accordance with the teachings of this invention as assembled and mounted to a cylinder head in an internal combustion engine.

FIGS. 4–6 show a heating device 110 coupled to a cylinder head 112 having an intake opening 114 and a plurality of threaded bores 116. Heating device 110 further includes a mounting member 118 having a plurality of mounting apertures 120 cooperative with cylinder head threaded bores 116 such that mounting bolts 146 removably connect mounting member 118 to cylinder head 112. In the embodiment shown in FIG. 4, heating device 110 is shown to include a separate intake cover 190 having apertures 192 and a second gasket 194 having apertures 196. Intake cover 190 includes an air intake opening 122 similar in shape and function as the air intake opening 22 previously described for the embodiment shown in FIG. 1. Mounting bolts 146 removably yet sealingly connect intake cover 190, first and second gaskets 144, 194 and mounting member 118 to cylinder head 112. However, those skilled in the art should appreciate that the intake cover 190 shown in FIG. 4 may be formed integral with mounting member 118 to form a mounting apparatus similar to that shown in FIG. 1 wherein the flow of electric current from battery 140 to heating element 115 is isolated from gaskets 144, 194 by mounting member 118 and insulator bushing 160 as hereinafter described.

Mounting member 118 is provided with a plurality of mounting posts 138 which are preferably removably connected to mounting member 118 through cooperatively sized mounting apertures 135 (FIGS. 5 and 6) having an axial center substantially parallel to the planar surface of intake cover 190 by securing means 150. As will be discussed in further detail hereinafter, securing means 150 is substantially identical to securing means 50 previously discussed and shown in FIGS. 1–3. Further, a plurality of mounting posts 138 again generally include a first end post 170 connected to a power source such as a battery 140 by a conducting strap 141 or other equivalent means and a second end post 172. It should be appreciated by those skilled in the art that mounting member 118 is electrically connected to ground either directly by mounting bolts 146 or through a ground strap 142. When ground strap 142 is used, insulator bushing 160 shown in FIG. 5 is replaced by a second insulating sleeve 161 as shown in FIG. 6.

As best seen in FIGS. 5 and 6, securing means 150 includes a bolt 151 having a head 152, a body portion 154 and a threaded end 156 cooperative with a threaded nut 158. An insulator bushing 160 and insulating sleeve 162 electrically and thermally isolate bolt 151 from mounting member 118 and gaskets 144 and 194 (FIG. 4). Further, a plurality of conducting spacers 164 and insulating spacers 166 cooperate with bolt 151 and threaded nut 158 to structurally support resistance ribbons 136 and electrically connect resistance ribbons 136 to battery 140 and to ground.

With reference to the ability to connect resistance ribbons 36, 136 in the present invention either in parallel or in series with a power source, it will be appreciated by those skilled in the art that the arrangement of conducting and insulating spacers shown in FIGS. 2 and 3 and hereinafter discussed may be used either in the embodiment shown in FIG. 1 or in the alternative embodiment shown in FIG. 4. Similarly, the arrangement shown in FIGS. 5 and 6 may be used in either embodiment to connect resistance ribbons 36,136 in series with battery 40, 140. For simplicity, a detailed description of the parallel and serial connections is made only with respect to the embodiment in which the respective connection is shown.

With reference to FIGS. 2 and 3, resistance ribbons 36 are shown electrically connected in parallel with battery 40. First end post 70 is electrically connected to battery 40 by a strap 41 allowing current to flow into mounting bolt 51, through body portion 54, and into bolt head 52. A conducting spacer 64a is shown in contact with bolt head 52 thereby permitting current flow into lowermost resistance ribbon 36a. Additional conducting spacers 64b, 64c and 64d (FIG. 2) electrically interconnect and separate resistance ribbons 36b, 36c and 36d thereby also allowing current to flow therethrough from bolt head 52. An insulating spacer 66e is provided adjacent mounting member 18 to prevent current flow into grounded mounting member 18 from uppermost resistance ribbon 36d.

As best seen in FIG. 2, each of the plurality of intermediate posts 74 include only insulating spacers 66 supporting and separating resistance ribbons 36a, 36b, 36c and 36d while electrically isolating the current flow paths therethrough from first end post 70 to second end post 72. Second end post 72 provides a grounding terminal supporting resistance ribbons 36 and includes only conducting spacers 64 electrically connecting resistance ribbons 36a, 36b, 36c and 36d to grounded mounting member 18.

As reflected in FIGS. 4, 5 and 6, resistance ribbons 136 may also be electrically connected in series with battery 140. In this arrangement, first end post 170 is connected to battery 140 and a conducting spacer 164a is in contact with bolt head 152 thereby allowing current to flow into lowermost resistance ribbon 136a as best seen in FIG. 5. However, as illustrated in FIG. 5, at first end post 170 an insulating spacer 166b is in contact with lowermost resistance ribbon 136a thereby preventing the flow of electric current to second resistance ribbon 136b. Rather, as will be appreciated by those skilled in the art, all of the current flowing through bolt 151 passes into lowermost resistance ribbon 136a at first end post 170 and passes therethrough and into conducting spacer 164b mounted on second end post 172 (FIG. 6).

As best seen in FIG. 6, the spacers disposed on second end post 172 include an insulating spacer 166a between bolt head 152 and lowermost resistance ribbon 136a, a conducting spacer 164b between resistance ribbons 136a and 136b, an insulating spacer 166c between resistance ribbons 136b and 136c, a conducting spacer 164d between resistance ribbons 136c and 136d and an insulating spacer 166e between resistance ribbon 136d and mounting member 118. As will be appreciated by those skilled in the art, the arrangement of spacers 164 and 166 on first and second end posts 170, 172 connects resistance ribbons 136a, 136b, 136c and 136d in series and causes the electric current from battery 140 to flow through resistance ribbon 136a in the direction of second end post 172, through resistance ribbon 136b in the direction of first end post 170, through resistance ribbon 136c in the direction of second end post 172, and through resistance ribbon 136d in the direction of first end post 170. Upon exiting resistance ribbon 136d, the electric current passing therethrough enters conducting spacer 164e on first end post 170 and passes into grounded mounting member 118.

It will be appreciated that intermediate mounting posts 174, disposed between first end post 170 and second end post 172, include only insulating spacers 166 contacting and separating resistance ribbons 136a, 136b, 136c and 136d when heating element 115 is connected in series just as when heating element 15 of the heating device 10 is connected in parallel.

While two embodiments of heating device 10, 110 have been discussed and illustrated with respect to the location and orientation of heating element 15, 115 relative to mounting member 18, 118, it should be appreciated by those skilled in the art that other arrangements of heating element 15, 115 may be provided without departing from the intended scope of this disclosed and the appended claims. Further, it should also be appreciated that variations to the disclosed mounting posts 38, 138 and securing means 50, 150 disclosed herein may also be made without departing from the disclosed invention.

A still further advantage of the heating device of the present invention is illustrated by the embodiment shown in FIGS. 7–10. As described in detail hereinafter, this embodiment includes a cover having supporting elements to which the heating ribbons are coupled to and vertically oriented relative to the cover. This vertical orientation reduces the resistance to airflow created by the resistance ribbons. As a result, a heating device configured in a manner such as is illustrated in FIGS. 7–10 and described herein, efficiently incorporates the advantages of a reduced cover profile and flexibility in electrically connecting the heater elements while minimally impacting the flow of air into the cylinders.

Figure 7:
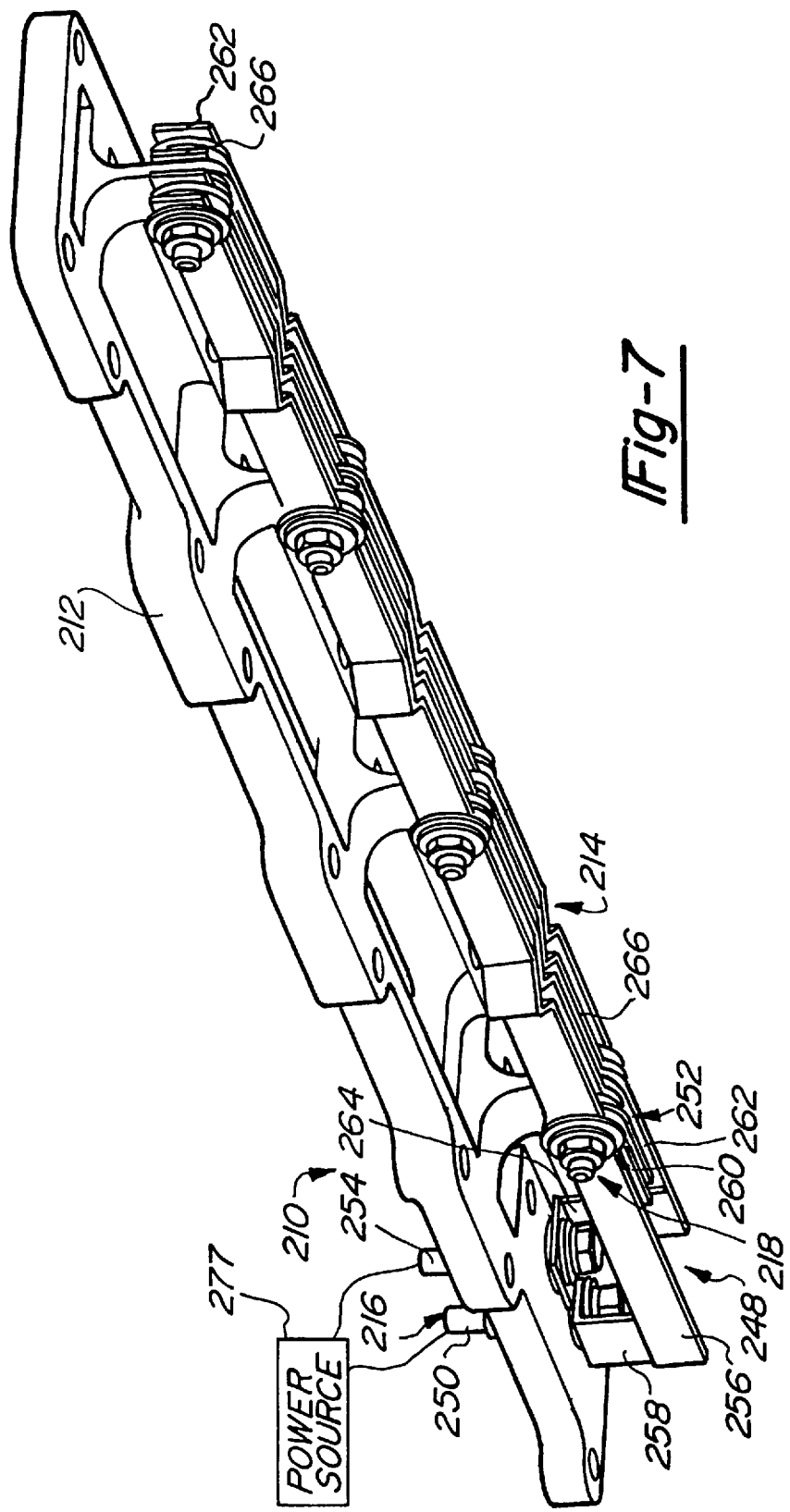
FIG. 7 is a perspective view of another embodiment of the heating device including a cover having hangers for supporting the heating elements in a vertical orientation.
Figure 8:
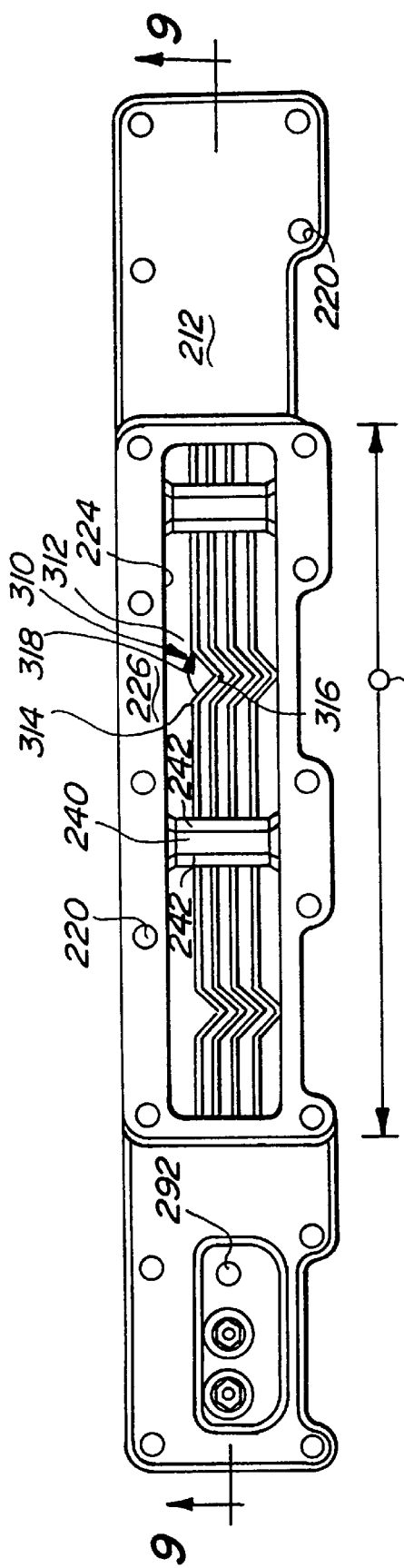
FIG. 8 is a top plan view of the heating device shown in FIG. 7.
Figure 9:
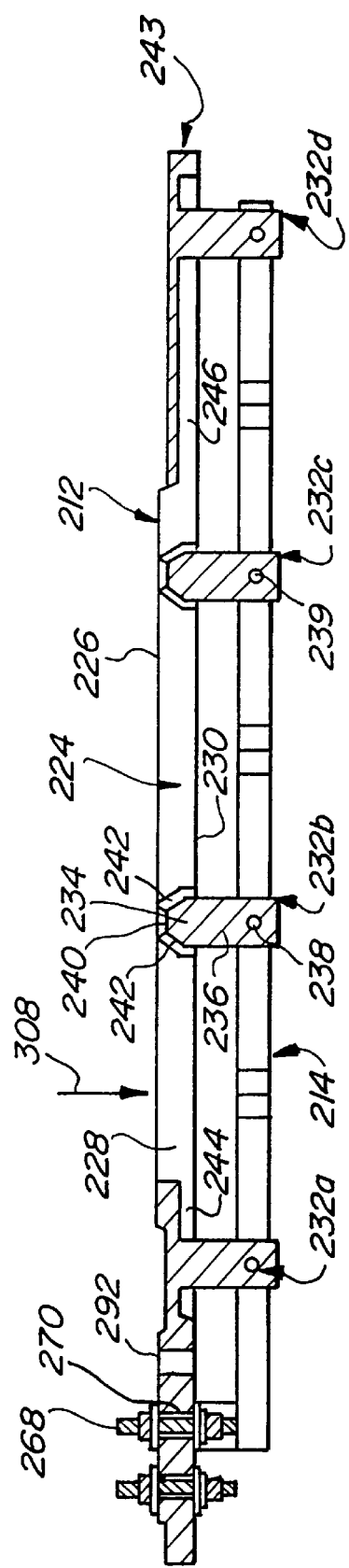
FIG. 9 is a sectional view of the heating device shown in FIG. 7 taken along the line 9—9 shown in FIG. 8.

A heating device 210 is illustrated in FIGS. 7–9 to generally include a cover 212, heating assembly 214, terminal assemblies 216, and coupling assemblies 218. Those skilled in the art will appreciate that heating device 210 may be connected to the cylinder head of an internal combustion engine in substantially the same manner as heating device 10 is coupled to cylinder head 12 in FIG. 1. Specifically, as best illustrated in FIG. 8, cover 212 is provided with a plurality of apertures 220 generally circumscribing the periphery of the cover. Moreover, with continued reference to FIG. 8, a center section 222 of cover 212 defines an air intake opening 224 circumscribed by a seal face 226 that is configured to cooperate with an air intake supply apparatus or intake manifold (not shown) similar to that illustrated in FIG. 1.

As illustrated in FIG. 9, opening 224 is partially defined by vertical side wall 228 interconnecting seal face 226 with a lower surface 230 of cover 212. Cover 212 also includes a plurality of hangers 232a, 232b, 232c, and 232d generally including a horizontal support portion 234 and a vertically downwardly extending tab 236 as shown with reference to hanger 232b. Each of tabs 236 extend from support 234 in a plane substantially parallel to the direction of air intake opening 224 as generally defined by side wall 228. Tabs 236 also define an aperture 238 having an axis 239 perpendicular to air intake opening 224. By this configuration, heating assembly 214 may be coupled to cover 212 in a vertical orientation as is more fully described below.

Those skilled in the art will appreciate that while the embodiment in FIGS. 7–10 illustrates cover 212 as including four hangers 232a, 232b, 232c, and 232d, a variety of configurations and arrangements may be used. As illustrated, hangers 232b and 232c are within the space defined by air intake opening 224 and, to facilitate airflow through the opening, horizontal support portion 234 includes a horizontal surface 240 and a pair of inclined surfaces 242 (FIGS. 8 and 9). As best illustrated in FIG. 9, each of hangers 232a–232d are integral with cover 212. Specifically, in the embodiment illustrated in the drawings, cover 212 is cast to include a plate-like body portion 243 and hangers 232a–232d integral with body 243.

Figure 10:
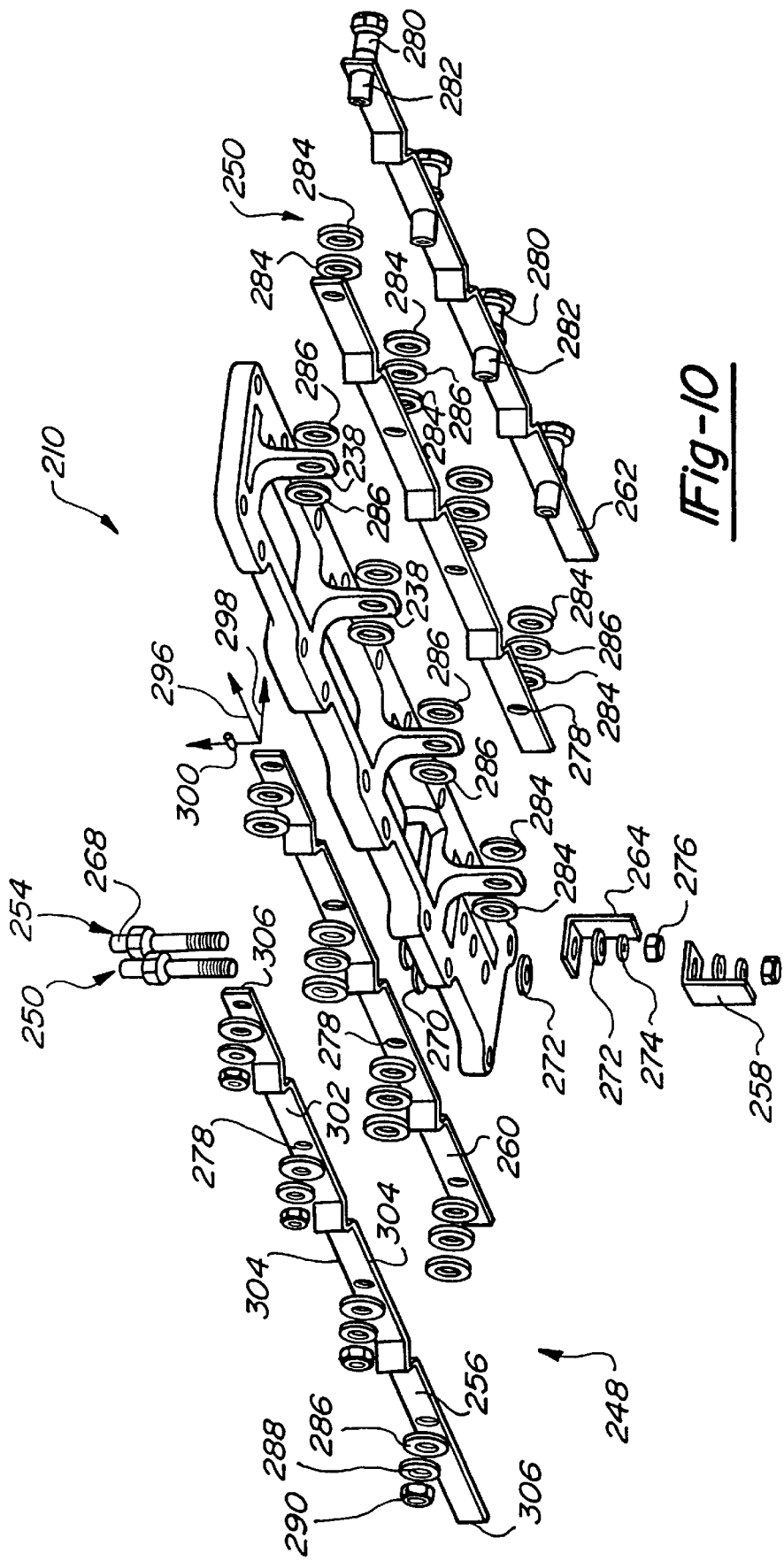
FIG. 10 is an exploded perspective view of the heating device shown in FIG. 7.

To further facilitate airflow to and about the heating assembly 214, cover 212 is formed to include air communication cavities 244 and 246 (FIG. 9) designed to communicate air from the air intake opening toward the extremity of heating assembly 214 thereby increasing the heat exchange capacity of heating device 210. With reference to FIG. 7, heating assembly 214 includes a first heating element 248 electrically connected to a first terminal 250 and a second heating element 252 electrically connected to a second positive terminal 254. More particularly, FIGS. 7 and 10 illustrate that first heating element 248 includes a first outer resistance ribbon 256 in contacting engagement with a bracket 258 of first terminal 250. First heating element 248 also includes a first inner resistance ribbon 260 electrically connected to first outer resistance ribbon 256 and to ground as hereinafter described. In a similar manner, second heating element 252 includes a second outer resistance ribbon 262 in contacting engagement with bracket 264 of second terminal 254 and a second inner resistance ribbon 266 electrically connected to second outer resistance ribbon 262 and to ground as hereinafter described.

The variety of parts included with coupling assembly 218 and terminal assemblies 216 are best illustrated in the exploded perspective view of heating device 210 shown in FIG. 10. Specifically, first and second terminals 250 and 254, respectively, each include a bolt 268, insulating sleeves 270, insulating washers 272, conducting brackets 258 and 264, respectively, as described above, lock washers 274, and hex nuts 276. Those skilled in the art will appreciate that sleeves 270 and washers 272 electrically isolate bolts 268 from cover 212 while electrically connecting brackets 258 and 264 thereto. The brackets are coupled and secured to bolts 268 by appropriately sized apertures formed therein and by cooperating hex nuts 276. Those skilled in the art will further appreciate that a variety of alternative coupling and electrical connection arrangements generally known in the art may be used without departing from the scope of the invention as defined by the appended claims.

First and second outer resistance ribbons 256 and 262 are coupled to hangers 232a–232d so as to be in contacting engagement with brackets 258 and 264, respectively, as described above. By this arrangement, the electric current from a power source 277 (FIG. 7) passes through bolts 268, brackets 258 and 264, respectively, and to and through first and second heating elements 248 and 252 via first and second outer heating ribbons 256 and 262, respectively. While the contacting engagement between the outer resistance ribbons and brackets described above is believed to provide an effective and easily assembled terminal connection, those skilled in the art will appreciate that a variety of alternatives known in the art may be used without departing from the scope of the invention as hereinafter defined.

The coupling and electrical interconnection between the respective resistance ribbons is also illustrated in FIG. 10. More particularly, resistance ribbons 256 and 260 of first heating element 248 are disposed on a first side of hangers 232a–232d and electrically connected to first bracket 258 as described above and to ground as hereinafter described. Moreover, each heating ribbon includes a plurality of apertures generally indicated by reference numeral 278. The apertures are located along the longitudinal length of the respective ribbons to cooperate with apertures 238 in hangers 232a–232d.

Coupling assembly 218 cooperates with apertures 278 and 238 to couple the resistance ribbons to the hangers and to electrically interconnect the heating ribbons in a selected configuration. In the illustrated embodiment, coupling assembly 218 includes a plurality of bolts 280, insulating sleeves 282, conducting spacers 284, insulating washers 286, lock washers 288, and hex nuts 290. In a manner generally similar to that described with reference to the embodiments illustrated in FIGS. 1–6, the conducting spacers 284 and insulating washers 286 are arrangeable upon sleeve 282 and bolt 280 to electrically connect first and second heating elements 248 and 252 in parallel with power source 277. It is contemplated that sleeves 282 are formed of glass fiber tubing while insulating washers 286 are mica washers as generally known in the art. However, those skilled in the art will appreciate that various materials may be used to provide the insulating and conducting features described herein without departing from the scope of the invention as defined by the appended claims.

In the illustrated embodiment, outer and inner resistance ribbons 256 and 260 of first heating element 248 are electrically connected in series with one another. Likewise, outer and inner resistance ribbons 262 and 266 of second heating element 252 are also electrically connected to one another in series. In this arrangement, inner resistance ribbons 260 and 266 are electrically connected to hanger 232a such as by conducting spacers 284 (FIG. 10). In turn, cover 212 is coupled to ground such as in the general manner illustrated in FIGS. 1–6. At hangers 232b–232d, the ribbons are electrically isolated from the hangers by insulating washers 286.

A specific alternative grounding configuration is contemplated to include a third terminal (not shown) disposed within aperture 292 (FIGS. 8 and 9) in the manner described above and for use as an isolated ground. In this configuration, the third terminal is coupled to ground and the heating elements are electrically isolated from each of hangers 232a–232d. Those skilled in the art will appreciate that the third terminal could be electrically connected to inner resistance ribbons 260 and 266 such as by a bracket or brackets similar to brackets 258 and 264 or by equivalent assemblies known in the art.

To accommodate the parallel connection of the respective heating elements 248 and 252 as well as the serial connection of their respective resistance ribbons, a pair of metallic spacers 284 are provided about sleeves 282 at each hanger 232a–232d. Where the resistance ribbons within each heating element are desired to be electrically isolated from one another, i.e. at supports 232a–232c, an insulating washer 286 is disposed between metallic spacers 284 (FIG.10). Conversely, at support 232d, the insulating washer is omitted such that current is transferred from the outer resistance ribbon, 256 and 262, respectively, to the inner resistance ribbon, 260 and 266, respectively. A variety of electrical interconnections for resistance ribbons of varying number and length will be readily apparent to one skilled in the art based upon a review of the drawings, disclosure, and claims included in this application.

As alluded to above, the cooperative arrangement of cast-in supports 232a–232d and the interspaced apertures 278 in the resistance ribbons allow the ribbons to be coupled to and supported by the cover in a vertical orientation. Specifically, each of the resistance ribbons define a longitudinal axis 296 (FIG. 10) in relation to which is defined a horizontal transverse axis 298 and a vertical transverse axis 300. With reference to these axes, each resistance ribbon includes a pair of longitudinal faces 302, horizontal transverse faces 304, and vertical transverse end faces 306. The vertical orientation of the resistance ribbons places the horizontal transverse faces 304 thereof perpendicular to the airflow through air intake opening 224 and the longitudinal surfaces 302 parallel to the general direction of the airflow indicated by arrow 308 in FIG. 9. This vertical orientation of the resistance ribbons relative to the airflow and cover 212 minimizes the airflow resistance created by heating elements 248 and 252 while maximizing their heat transfer characteristics.

Finally, turning to the configuration of the resistance ribbons illustrated in the drawings, each resistance ribbon preferably includes an arrangement 310 (FIG. 8) for accommodating thermal expansion of the ribbon. Expansion arrangement 310 is preferably a "V-shaped" bend defining a pair of inflection points 312 and 314 and a vertex 316. The vertex defines an angle 318 that one skilled in the art will appreciate is reduced in magnitude upon the heating of the resistance ribbon. More particularly, as the heated resistance ribbon increases in temperature during operation, it expands to move inflection points 312 and 314 toward one another and reduce angle 318. While the angle 318 may vary, before heating of the ribbons, the angle 318 is preferably within the range of about eighty seven degrees (87°) to about ninety three degrees (93°) and more preferably about ninety degrees (90°). However, those skilled in the art will appreciate that the magnitude of angle 318 is dependent upon a variety of factors including the coefficient of thermal expansion of the ribbon material, the distance between adjacent expansion arrangements, and the temperature increase of the ribbon during operation.

The inclusion of expansion arrangement 310 within each of the resistance ribbons decreases the stresses to which the resistance ribbons, hangers 232*a*–232*d*, and coupling assembly 218 are subjected when the resistance ribbons are heated. Those skilled in the art will further appreciate that while each resistance ribbon is shown to include three such expansion arrangements at equally spaced intervals, the number and location of such expansion arrangements may be modified without departing from the scope of the invention as defined by the appended claims.

With reference to FIGS. 11 and 12, another embodiment of the present invention is illustrated wherein resistance ribbons 456, 458, 460, and 462 are coupled to cover 412 such as at hangers 432*a*–*d*. The structural and electrical connection illustrated in FIGS. 11 and 12 is substantially the same as that described herein with reference to FIGS. 7–10.

As best illustrated in FIG. 12, resistance ribbons 456, 458, 460, and 462 each include an expansion arrangement generally providing the benefits discussed above with regard to expansion arrangement 310. Specifically, the resistance ribbons illustrated in FIG. 12 include broad "V-shaped" bends each defining a pair of inflection points 512 and 514 and a vertex 516. The resistance ribbons define an angle 518 at vertex 516 that is slightly less than one hundred and eighty degrees (180°). This arrangement allows for additional clearance when installing the heating device into the cylinder head and insures that the vertex 516 of each ribbon is displaced in the direction indicated by arrow 519 upon thermal expansion of the ribbons.

Just as with the embodiment described with reference to FIGS. 7–10, the resistance ribbons shown in FIGS. 11 and 12 may be electrically coupled to terminals 450 and 454 either in series or in parallel. As described above, the ribbons may be electrically grounded such as at hanger 432*a*, through one of terminals 450 and 454, or through an additional terminal (not shown) disposed within aperture 492.

Accordingly, from the above description, those skilled in the art will appreciate that the heating device according to the present invention may be configured to provide a 24-volt heating arrangement by electrically connecting resistance ribbons 456, 458, 460, and 462 in series. This arrangement could include electrically connecting one of resistance ribbons 456 and 462 to a power source through one of terminals 450 and 454 and electrically connecting the other of resistance ribbons 456 and 462 to ground via hanger 432*a* (grounded to cover) or through the other of terminals 450 and 454 (isolated ground). A 12-volt heating device may be provided by electrically connecting resistance ribbons 456 and 458 in series with one another and in parallel with serially connected ribbons 460 and 462. In the 12-volt configuration, the ribbons may again be grounded to the cover such as through hanger 432*a* or grounded by an isolated ground such as through a terminal disposed within aperture 492.

Those skilled in the art will appreciate that any one of the resistance ribbons may be coupled to a terminal such as 450 and 454 by contacting engagement by fixing the ribbons to the terminal by welding, or by other methods known in the art.

Various other advantages and modifications will become apparent to one skilled in the art after having the benefit of studying the teachings of the specification, the drawings and the following claims.

What is claimed is:

1. A heating device for use in an internal combustion engine comprising:

a frame including a body defining an air intake opening defining a direction of airflow, and a hanger extending from said body in said direction of airflow;

a first resistance ribbon;

a terminal assembly coupled to said frame, electrically connected to said first resistance ribbon and electrically connectable with a power source; and securing means for coupling said first resistance ribbon to said hanger.

2. The heating device of claim 1 wherein said hanger is integral with said body.

3. The heating device of claim 1 further including a second resistance ribbon, said securing means coupling said first and second heating elements to said hanger.

4. The heating device of claim 3 wherein said first and second resistance ribbons are electrically connected in series with one another and with said power source.

5. The heating device of claim 3 wherein said terminal assembly includes a first terminal electrically connected to said first resistance ribbon and a second terminal electrically connected to said second resistance ribbon.

6. The heating device of claim 3 wherein said body defines an aperture and said terminal assembly includes a first post and a first bracket, said first post disposed in said aperture and coupled to said body, said first bracket coupled to and electrically connected to said first post, one of said first and second resistance ribbons electrically connected with said first bracket, and said first post electrically connected to said power source.

7. The heating device of claim 6 wherein said body defines an opening and said terminal further includes a second post and a second bracket, said second post disposed in said opening and coupled to said body, said second bracket coupled to and electrically connected to said second post, the other of said first and second resistance ribbons electrically connected with said second bracket, and said second post electrically connected to said power source.

8. The heating device of claim 1 wherein said first resistance ribbon includes an aperture, wherein said securing means for coupling said first resistance ribbon to said hanger includes an opening formed in said hanger and a bolt passing through said opening and said aperture to couple said first resistance ribbon to said hanger.

9. The heating device of claim 1 wherein said first resistance ribbon includes expansion means for accommodating thermal expansion of said first resistance ribbon.

10. The heating device of claim 9 wherein said expansion means includes a V-shaped bend in said first resistance ribbon.

11. The heating device of claim 10 wherein said V-shaped bend defines a vertex and first and second inflection points, said V-shaped bend defining an angle slightly less than 180°.

12. The heating device of claim 1 wherein said body includes a first surface and a second surface, said air intake opening extending from said first surface to said second surface, said hanger including a support having a first end and a second end, each of said first and second ends integral with said body, said hanger further including a tab integral with and extending from said support.

13. The heating device of claim 1 further including a second resistance ribbon, said first resistance ribbon and said second resistance ribbon electrically connected in parallel with the power source.

14. A heating device for use in an internal combustion engine comprising:

a frame defining an air intake opening;

a hanger coupled to said frame, said hanger having an aperture with an axis substantially perpendicular to said air intake opening;

a first heating element; and securing means disposable in said aperture for coupling said first heating element to said hanger.

15. The heating device of claim 14 wherein said frame includes a body and said hanger and wherein said hanger is die cast integral with said body.

16. The heating device of claim 15 wherein said first heating element includes a first resistance ribbon and a second resistance ribbon, said first resistance ribbon electrically connected in series with said second resistance ribbon.

17. The heating device of claim 16 further including a second heating element having a third resistance ribbon and a fourth resistance ribbon, said third resistance ribbon electrically connected in series with said fourth resistance ribbon, said securing means coupling said second heating element to said hanger.

18. The heating device of claim 17 wherein said first and second heating elements are electrically connected in series.

19. The heating device of claim 17 wherein said first and second heating elements are electrically connected in parallel.

20. An intake manifold cover comprising:

a plate-like body having a first surface, a second surface, and an air intake opening extending between said first and second surfaces;

a hanger integral with said body and extending from said second surface in a plane substantially parallel to said air intake opening, said hanger defining an aperture having an axis substantially perpendicular to said air intake opening.

* * * * *

UNITED STATES PATENT AND TRADEMARK OFFICE
CERTIFICATE OF CORRECTION

PATENT NO. : 5,887,575
DATED : Mar. 30, 1999
INVENTOR(S) : Jan P. Thimmesch et al It is certified that error appears in the above-identified patent and that said Letters Patent is hereby corrected as shown below:

On the Title Page, under References Cited,
U.S. Patent Documents, add --5,595,164  1/1997  Thimmesch-- PTO Col. 2, line 28 - after "is" insert --to--

Col. 4, line 49 - "referenced" should be --reference--

Col. 7, line 55 - after "disclosed" insert --invention--

Signed and Sealed this

Twenty-first Day of December, 1999

Attest:

Q. TODD DICKINSON

*Attesting Officer*          *Acting Commissioner of Patents and Trademarks*